US 8,204,470 B2

(12) United States Patent
Onggosanusi et al.

(10) Patent No.: US 8,204,470 B2
(45) Date of Patent: Jun. 19, 2012

(54) PREDECODING FOR JOINT PROCESSING COORDINATED MULTI-POINT TRANSMISSION

(75) Inventors: Eko N. Onggosanusi, Allen, TX (US); Tarik Muharemovic, Dallas, TX (US); Anthony Ekpenyong, Dallas, TX (US); Zukang Shen, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/683,304

(22) Filed: Jan. 6, 2010

(65) Prior Publication Data

US 2010/0273495 A1 Oct. 28, 2010

Related U.S. Application Data

(60) Provisional application No. 61/142,774, filed on Jan. 6, 2009.

(51) Int. Cl.
 *H04Q 7/00* (2006.01)
(52) U.S. Cl. ......... 455/329; 370/334; 370/342; 455/450
(58) Field of Classification Search .................. 370/329, 370/334, 342; 455/450
See application file for complete search history.

(56) References Cited

U.S. PATENT DOCUMENTS

| 7,995,528 | B1 * | 8/2011 | Cendrillon et al. | ........... 370/329 |
|---|---|---|---|---|
| 2010/0150266 | A1 * | 6/2010 | Mondal et al. | ................ 375/296 |
| 2010/0323611 | A1 * | 12/2010 | Choudhury | ........................ 455/7 |
| 2011/0019613 | A1 * | 1/2011 | Han et al. | ...................... 370/328 |

OTHER PUBLICATIONS

3GPP Organizational Partners, "3rd Generation Partnership Project; Technical Specification Group Radio Access Network; Further Advancements for E-UTRA Physical Layer Aspects (Release X)", 3GPP TR 36.814, Sep. 2008, all pages, V0.2.0, Antibes, France.
ETRI, "Per-Cell Precoding Methods for Downlink Joint Processing CoMP", 3GPP TSG RAN WG1 Meeting #55, Nov. 10-14, 2008, all pages, Prague, Czech Republic.
Nokia Siemens Networks, Nokia, "Scalable CoMP Solutions for LTE Advanced", #GPP TSG-RAN WG1 Meeting #55, Nov. 10-14, 2008, all pages, Prague, Czech Republic.
Ericsson, "Downlink Coordinated Transmission—Impact on Specification", TSG-RAN WG1 #55, Nov. 10-14, 2008, Prague, Czech Republic.
Motorola, "Coordinated Multi-Point Transmission—Exploring Possible System Operations and UE Support", TSG-RAN WG1 #55, Nov. 10-14, 2008, Prague, Czech Republic.
Texas Instuments, "Aspects of Coordinated Multi-Point Transmission for Advanced E-UTRA", 3GPP TSG RAN WG1 #55, Nov. 11-15, 2008, Prague, Czech Republic.
NTT Docomo, Inc., "Inter-Cell Radio Resource Management for Heterogeneous Network", 3GPP TSG RAN WG1 Meeting #55, Nov. 10-14, 2008, Prague, Czech Republic.

(Continued)

*Primary Examiner* — Danh Le
(74) *Attorney, Agent, or Firm* — Robert D. Marshall, Jr.; Wade James Brady, III; Frederick J. Telecky, Jr.

(57) ABSTRACT

This invention is a method of predecoding for joint processing coordinated multi-point transmission. The invention identifies for a particular transmission the cooperating point and the transmit antenna. The invention selects a code by reference to a selected one of a super-cell codebook for each combination of cooperating point and transmit antenna and a multi-cell codebook for each transmit antenna regardless of the cooperating point.

2 Claims, 2 Drawing Sheets

OTHER PUBLICATIONS

3GPP Organizational Partners, "3rd Generation Partnership Project; Technical Specification Group Radio Access Network; Evolved Universal Terrestrial Radio Access (E-UTRA); Physical Channels and Modulation (Release 10)", 3GPP TS 36.211, Sep. 2011, all pages, V10.3.0, Valbonne, France.

3GPP Organizational Partners, "3rd Generation Partnership Project; Technical Specification Group Radio Access Network; Evolved Universal Terrestrial Radio Access (E-UTRA); Physical Layer Procedures (Release 10)", 3GPP TS 36.213, Dec. 2010, all pages, V10.0.1, Valbonne, France.

3GPP Organizational Partners, "3rd Generation Partnership Project; Technical Specification Group Radio Access Network; Evolved Universal Terrestrial Radio Access (E-UTRA); Multiplexing and Channel Coding (Release 10)", 3gPP TS 36.212, Dec. 2010, all pages, V10.0.0.

* cited by examiner

US 8,204,470 B2

PREDECODING FOR JOINT PROCESSING COORDINATED MULTI-POINT TRANSMISSION

CLAIM OF PRIORITY

This application claims priority under 35 U.S.C. 119(e)(1) to U.S. Provisional Application No. 61/142,774 filed Jan. 6, 2009.

TECHNICAL FIELD OF THE INVENTION

The technical field of this invention is mobile wireless telephones.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up link 111 time or frequency or code resources. If UE 109 has data ready for transmission, which may be traffic data, measurements report, tracking area update, UE 109 can transmit a random access signal on up link 111. The random access signal notifies base station 101 that UE 109 requires up link resources to transmit the UEs data. Base station 101 responds by transmitting to UE 109 via down link 110, a message containing the parameters of the resources allocated for UE 109 up link transmission along with a possible timing error correction. After receiving the resource allocation and a possible timing advance message transmitted on down link 110 by base station 101, UE 109 optionally adjusts its transmit timing and transmits the data on up link 111 employing the allotted resources during the prescribed time interval.

SUMMARY OF THE INVENTION

This invention is a method of predecoding for joint processing coordinated multi-point transmission. The invention identifies for a particular transmission the cooperating point and the transmit antenna. The invention selects a code by reference to a selected one of a super-cell codebook for each combination of cooperating point and transmit antenna and a multi-cell codebook for each transmit antenna regardless of the cooperating point.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
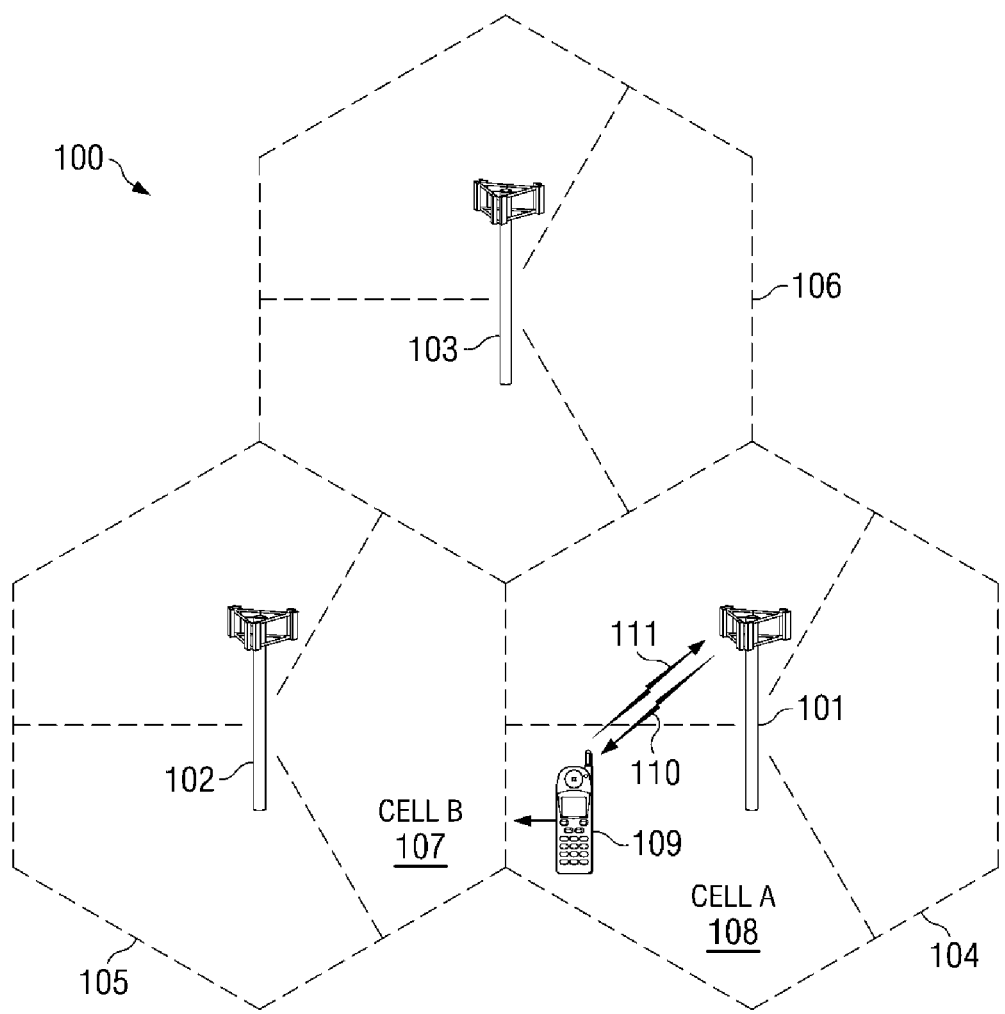
FIG. 1 is a diagram of a communication system of the prior art related to this invention having three cells.

For advanced E-UTRA, two categories of downlink coordinated multi-point (DL COMP) transmission are currently under consideration: joint processing; and coordinated beamforming. Joint processing is expected to offer more gain due to its Multimedia Broadcast multicast service Single Frequency Network (MBSFN) like combining gain at the expense of higher degree of coordination. The same set of transport blocks is cooperatively transmitted from multiple points such as eNB with multiple RREs. Different aspects of joint processing ought to be carefully designed to attain the large portion of its potential gain.

This patent application concerns precoding and computation of Channel Quality Indicator/Precoding Matrix Indicator/Rank Indicator (CQI/PMI/RI). Assuming baseline codebook-based precoding, the main issue is a choice between a single joint multi-cell codebook and separate codebooks. Such separate codebooks typically are the same across the cooperating cell. This concern is related to whether the CQI/PMI/RI is computed jointly for all the cooperating cells or separately across different cells.

This patent application defines a super-cell as an area covered by the transmission of the coordinated multiple points. Such as super-cell comprises N points transmitting in the downlink. Denote the number of transmit antennas associated with the n-th point as $N_{t,n}$ and the number of receive antennas at UE as $N_r$. Assuming $\tilde{N}$ out of N points are cooperating, the received signal can be expressed as follows:

$$y = [\sqrt{P_1}\, H_1 \; \cdots \; \sqrt{P_{\tilde{N}}}\, H_{\tilde{N}}] \begin{bmatrix} W_1 \\ W_2 \\ \vdots \\ W_{\tilde{N}} \end{bmatrix} s + n = HWs + n \quad (1)$$

where: s is the common L-dimensional data vector transmitted across the $\tilde{N}$ points; $W_n$ is a $N_{t,n} \times L$ precoding matrix applied on the n-th point; $H_n$ is the $N_r \times N_{t,n}$ channel matrix from the n-th transmission point to the UE; and $P_n$ is a power scaling factor. The aggregated matrix W can be treated as a single precoding matrix for the $$N_T = \sum_{n=1}^{\tilde{N}} N_{t,n}$$

distributed antennas. From equation (1) the number of transmission layers L:

$$L \leq \min\left(N_r, \sum_{n=1}^{\tilde{N}} N_{t,n}\right) = \min(N_r, N_T) \quad (2)$$

From equation (2), if $$N_r < \sum_{n=1}^{\tilde{N}} N_{t,n},$$

then the excess dimensions offer precoding diversity gain. This condition is likely in practice. This precoding diversity gain not only improves the data coverage (cell-edge throughput) but also the average sector throughput.

Also from equation (2), coordinated multi-point transmission does not increase the system peak data rate of any of the cells in the super-cell unless $N_r > \min(N_{t,n})$. An example of such a super-cell is a super-cell composed of multiple single-antenna cells. In this case, the peak data rate may be increased.

Two approaches in codebook design are joint design and disjoint design. In joint design a single super-cell codebook is designed considering multiple points. The joint design codebook needs for each combination of $\tilde{N}$ (the number of cooperating points), $N_t$ (the number of transmit antennas assuming the same number across eNBs/RREs), and L (the number of layers). Joint design is expected to offer better performance as the codebook is optimized for each combination of $(\tilde{N}, N_t, L)$.

In disjoint design the super-cell codebook is formed by concatenating $\tilde{N}$ common single-cell codebooks. Thus $W_n \in \Sigma$ where $\Sigma$ is the single-cell codebook. Disjoint design is simpler since only one single-cell codebook is needed for a given $(N_t, L)$ regardless of $\tilde{N}$. The performance of disjoint design tends to be worse than the joint design because the resulting multi-point codebook is not designed for multi-point transmission. Separate design is essentially a restricted/constrained case of the joint design.

This comparison covers the fundamental but intuitive differences between joint and disjoint codebook designs CQI/PMI/RI for COMP can be computed and reported in two manners. In a joint report the UE reports a single CQI/PMI/RI which is computed jointly for all the $\tilde{N}$ cells. In a disjoint report the CQI/PMI/RI is computed separately for each of the $\tilde{N}$ cells.

In both cases the CQI/PMI/RI is directly reported only to the serving cell (the master eNB) and distributed to the other $(\tilde{N}-1)$ cells via backhaul. Reporting CQI/PMI/RI only to the serving/master eNB seems to be better from coverage perspective since the reporting accuracy is not limited by the weakest link between the UE and all the transmission points. The difference between the two types of reporting mainly lies within the computation. Table 1 compares these two types of reporting.

TABLE 1

|  | Joint CQI/PMI/RI | Disjoint CQI/PMI/RI |
| --- | --- | --- |
| Computation | A single set of CQI/PMI/RI represents simultaneous transmission across $\tilde{N}$ transmission points (CQI may comprise multiple values, each of which represents a codeword) | For a given cell, the signal from other ($\tilde{N}-1$) transmission points are always treated as interference |
| Performance | Better in general | Worse in general |
| Choice of super-cell size $\tilde{N}$ | Semi-static, such as dedicated RRC signaling or SI-1 via long-term channel properties | Slightly more flexible: may be made more dynamic or semi-static |
| Modulation and Coding Scheme (MCS) flexibility | Same MCS across multiple transmission points associated with a given layer | Allows different MCS when different transmission points transmit different layers |
| UE computational complexity | Expected to be lower (only one CQI computation) | Expected to be higher (multiple CQI computations) |

Generally joint CQI/PMI/RI computation is more sensitive to non-idealities such as channel estimation error and measurement delay due to the timing references as well as potential backhaul latency for certain backhaul implementation.

As shown in Table 1, disjoint CQI/PMI/RI computation assumes that the signals from the other transmission points are interference rather than desired signal sources. This does not exploit the potential coherent combining MBSFN-like gain. Performance for disjoint CQI/PMI/RI computation is expected to be worse than that of joint CQI/PMI/RI computation. This can be seen from the following alternative form of equation (1):

$$y = \left(\sum_{n=1}^{\tilde{N}} \sqrt{P_n} H_n W_n\right)s + n = \sqrt{P_1} H_1 W_1 s + \left(\sum_{n=2}^{\tilde{N}} \sqrt{P_n} H_n W_n\right)s + n \quad (3)$$

Rather than making use the total effective channel $$HW = \sum_{n=1}^{\tilde{N}} \sqrt{P_n} H_n W_n$$

to decode s, in disjoint CQI/PMI/RI computation the desired signal components from other transmission points are considered interfering and hence suppressed.

There is an exception when different transmission points transmit different sets of spatial layers. In this case there should be no performance difference between the two CQI/PMI/RI computation strategies.

The precoding codebook takes the form of block diagonal matrix, possibly with permutation:

$$W = \begin{bmatrix} W_1 \\ W_2 \\ \vdots \\ W_{\tilde{N}} \end{bmatrix} = \Pi_{N_T} \begin{bmatrix} V_1 & 0 & \cdots & 0 \\ 0 & V_2 & \cdots & 0 \\ \vdots & \vdots & \ddots & \vdots \\ 0 & 0 & \cdots & V_{\tilde{N}} \end{bmatrix} \quad (4)$$

where: $\Pi_{N_T}$ is a row and/or column permutation (reordering) of the $N_T \times N_T$ identity matrix (out of $N_T$! possibilities). For example, $$\begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

is a 4×4 permutation matrix; $V_n$ is the $N_{t,n} \times L_n$ precoding matrix for transmission point n where $L_n$ is the number of layers transmitted by the transmission point n. This design offers additional flexibility since it performs the same under joint and disjoint CQI/PMI/RI report.

Denoting the signal vector transmitted from transmission point n as $s_n$ and using the precoding matrix structure given in equation (4), the received signal in equation (3) can be rewritten as equation (5).

$$y = \sum_{n=1}^{\tilde{N}} \sqrt{P_n} \tilde{H}_n V_n s_n + n \quad (5)$$

It is apparent from equation (5) that the signal components from other transmission points are interference sources which should be suppressed upon decoding the signal from a given transmission point. This holds regardless whether the CQI/

PMI/RI is computed and reported jointly or disjointly. Hence, the signal from each transmission point is decoded one at a time. While this appears to contradict the idea behind COMP, the precoding matrix in equation (4) offers an alternative to transmitting identical signal vector across different transmission points when $L \leq \min(N_{t,n})$ occurs for the COMP system. As an example, when $(\tilde{N}, N_{t,n}, N_r, L) = (2,2,2,2)$, two alternative structures for W are:

$$\Pi_4 \begin{bmatrix} V_1 & 0 \\ 0 & V_2 \end{bmatrix} = \Pi_4 \begin{bmatrix} V_1(0) & 0 \\ V_1(1) & 0 \\ 0 & V_2(0) \\ 0 & V_2(1) \end{bmatrix}, \text{ and} \quad \text{Structure 1}$$

$$\begin{bmatrix} W_1 \\ W_2 \end{bmatrix} = \begin{bmatrix} W_1(0,0) & W_1(0,1) \\ W_1(1,0) & W_1(1,1) \\ W_2(0,0) & W_2(0,1) \\ W_2(1,0) & W_2(1,1) \end{bmatrix}. \quad \text{Structure 2}$$

It is also possible to incorporate both structures in the codebook design.

The two alternative precoder structures can be constructed from the Rel-8 2 transmit (2Tx) codebook. The same applies for any value of $\tilde{N}$. For structure 1 $V_n$ is taken from the 1-layer 2Tx codebook $$\left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix}, \frac{1}{\sqrt{2}} \begin{bmatrix} 1 \\ j \end{bmatrix}, \frac{1}{\sqrt{2}} \begin{bmatrix} 1 \\ -j \end{bmatrix} \right\}.$$

For structure 2 $W_n$ is taken from the 2-layer 2Tx codebook $$\left\{ \frac{1}{2} \begin{bmatrix} 1 & 1 \\ 1 & -1 \end{bmatrix}, \frac{1}{2} \begin{bmatrix} 1 & 1 \\ j & -j \end{bmatrix} \right\}.$$

While designing a codebook to accommodate both CQI/PMI/RI reporting strategies seems attractive, it may be better to first decide the CQI/PMI/RI joint, disjoint, or both reporting strategy for COMP.

The two different codebook structures describe above are compared via a link-level throughput simulation performed with two transmission points. The resulting codebooks are:

$$CB1 (\text{without permutation}): \begin{bmatrix} V_1 & 0 \\ 0 & V_2 \end{bmatrix} \text{ where}$$

$$V_n \in \left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix}, \frac{1}{\sqrt{2}} \begin{bmatrix} 1 \\ j \end{bmatrix}, \frac{1}{\sqrt{2}} \begin{bmatrix} 1 \\ -j \end{bmatrix} \right\}; \text{ and}$$

$$CB2: \begin{bmatrix} W_1 \\ W_2 \end{bmatrix} \text{ where}$$

$$W_n \in \left\{ \frac{1}{2} \begin{bmatrix} 1 & 1 \\ 1 & -1 \end{bmatrix}, \frac{1}{2} \begin{bmatrix} 1 & 1 \\ j & -j \end{bmatrix} \right\}.$$

The ratio of the transmitted power between the serving point 1 and the secondary point 2 is denoted as C1/C2. The residual inter-cell interference is assumed to be −10 dB relative to the transmitted power of the serving point. Table 2 lists other the simulation assumptions.

TABLE 2

| Parameter | Explanation/Assumption |
|---|---|
| Bandwidth | 5 MHz |
| Antennas Configurations | 2 × 2 |
| 2 × 2 Receiver | LMMSE |
| Fading model | 3 Kmph TU-6 delay profile |
| Spatial channel model | Transmit and Receive correlation = 0.1, |
| BLER target for 1st transmission | 10% |
| MCS Set | 28-level MCS with QPSK, 16QAM, and 64QAM |
| Allocated RBs | 5, 10 |
| HARQ scheme | Chase Combining |
| Max number of retransmissions | 3 (total of 4 transmissions) |
| Number of HARQ processes | 8 |
| Sampling frequency | 7.68 MHz |
| FFT size | 512 |
| Number of occupied sub-carriers | 300 |
| Number of OFDMA symbols per TTI | 14 |
| Number of sub-carriers per RB | 12 |
| Overhead | 25% |
| Processing delay | 4 ms |
| Channel estimation | Ideal |

The case without COMP is simulated as a reference. Joint CQI/PMI/RI reporting is assumed.

Figure 2:
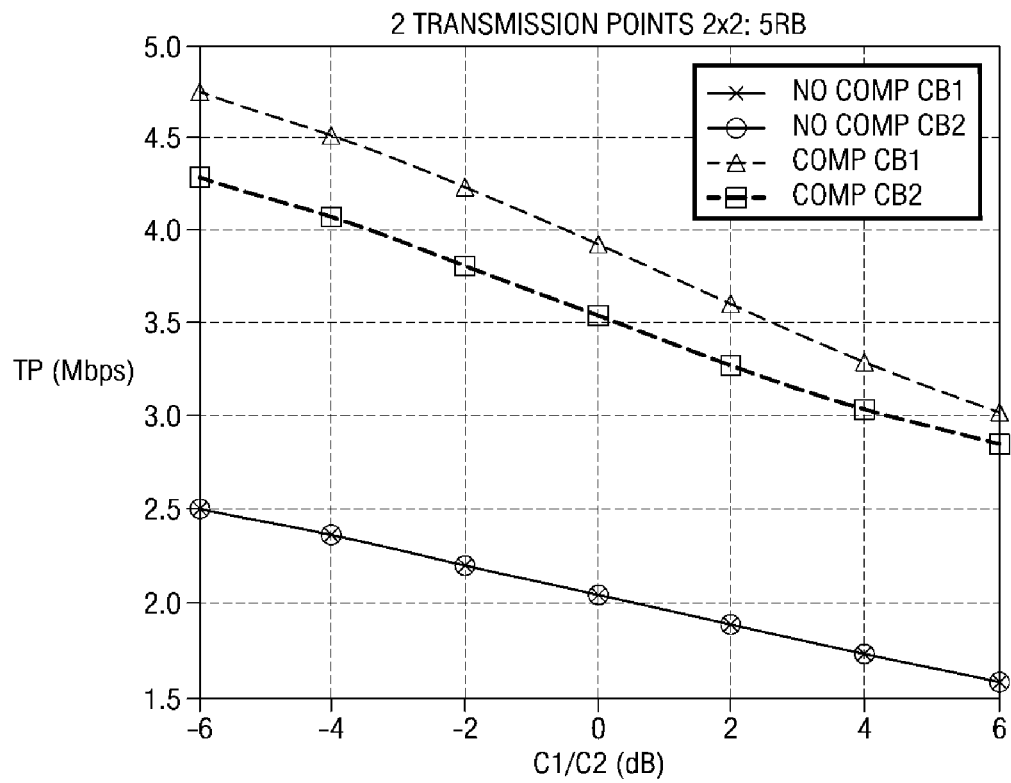
FIG. 2 illustrates a simulation of the throughput versus the C1/C2 ratio for various parameters with 5 radio bearers.
Figure 3:
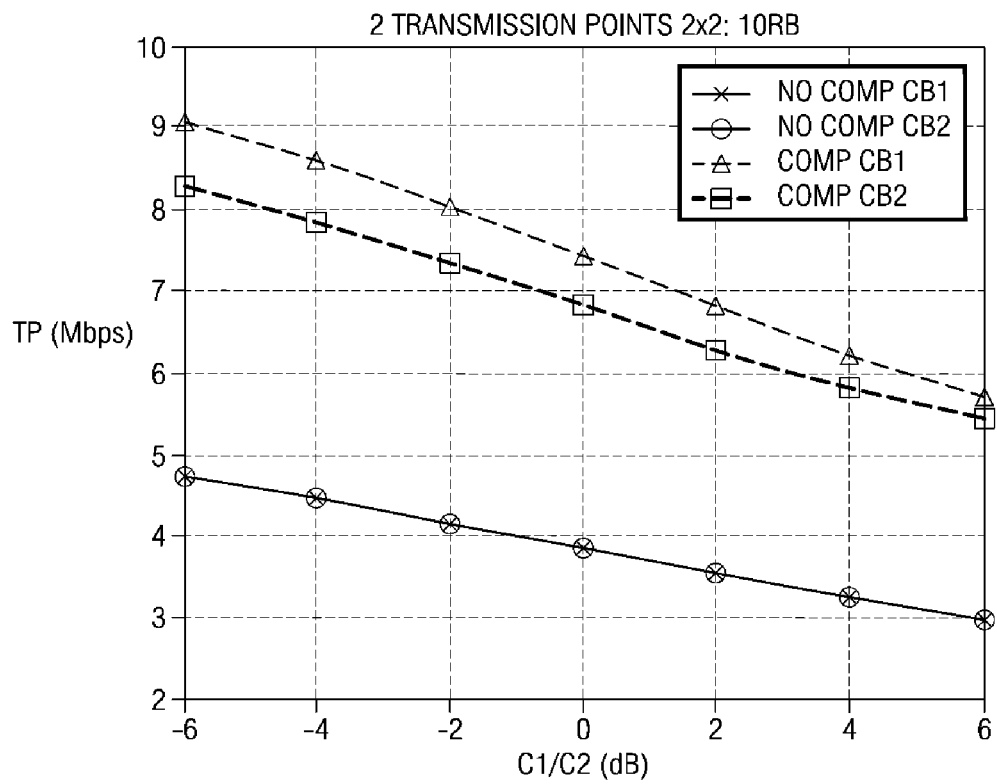
FIG. 3 illustrates a simulation of the throughput versus the C1/C2 ratio for various parameters with 10 radio bearers.

FIG. 2 illustrates the throughput versus the C1/C2 ratio for various combinations of coordinated multi-point (COMP) or non-COMP, and codebook 1 (CB1) or codebook 2 (CB2) for two transmission points and 5 radio bearers (RB) in the simulation. FIG. 3 similarly illustrates the throughput versus the C1/C2 ratio for various combinations of coordinated multi-point (COMP) or non-COMP, and codebook 1 (CB1) or codebook 2 (CB2) for two transmission points and 10 radio bearers (RB) in the simulation.

With COMP, CB1 outperforms CB2. This may not be surprising since CB1 has of size 16 while CB2 is 4. Note that CB1 and CB2 are simply extensions of the current Rel-8 2Tx codebook. It is possible to design the codebook without such constraints. The difference is larger for smaller RB allocation as expected.

Without COMP, the two codebooks do not exhibit any visible difference in performance.

Note that the gain of 2-point COMP (shown in FIG. 1) does not represent the overall system-level gain of COMP due to the absence of scheduling across UEs.

What is claimed is:

1. A method of predecoding for joint processing coordinated multi-point transmission comprising the steps of:
    designing a super-cell codebook for each combination of cooperating point and transmit antenna;
    designing a multi-cell codebook for each transmit antenna regardless of cooperating point;
    identifying for a particular transmission the cooperating point and the transmit antenna; and
    selecting a code by reference to a selected one of said super-cell codebook and said multi-cell codebook.

2. A method of predecoding for joint processing coordinated multi-point transmission comprising the steps of:
    designing a super-cell codebook for each combination of cooperating point and transmit antenna;
    designing a multi-cell codebook for each transmit antenna regardless of cooperating point;
    identifying for a particular transmission the cooperating point and the transmit antenna;

selecting a code by reference to a selected one of said super-cell codebook and said multi-cell codebook;
calculating at least one of a Channel Quality Indicator, a Precoding Matrix Indicator and a Rank Indicator jointly for all cells upon selection of a code from the super-cell code book; and
calculating a at least one of a Channel Quality Indicator, a Precoding Matrix Indicator and a Rank Indicator separately for each cell upon selection of a code from the multi-cell code book.

* * * * *